June 17, 1958 M. GRASER, JR 2,839,600

BRIGHTNESS CONTROL FOR COLOR TELEVISION RECEIVER

Filed July 1, 1955

INVENTOR:
MICHAEL GRASER, JR.
BY Donald N. Timbie
HIS ATTORNEY.

United States Patent Office 2,839,600

Patented June 17, 1958

2,839,600

BRIGHTNESS CONTROL FOR COLOR TELEVISION RECEIVER

Michael Graser, Jr., Syracuse, N. Y., assignor to General Electric Company, a corporation of New York Application July 1, 1955, Serial No. 519,447

4 Claims. (Cl. 178—5.4)

This invention relates to an improved master brightness control for apparatus that reproduces images in color in response to electrical signals.

One way of reproducing images in color is to modulate corresponding electrodes of each of a plurality of electron guns with what is termed a luminosity signal Y, which is substantially the same as a brightness signal. Each of other corresponding electrodes is modulated with a particular color difference signal $(R-Y)$, $(G-Y)$ or $(B-Y)$ (where $R$=red, $G$=green and $B$=blue). The combined effect of the Y modulation of one electrode and an $R-Y$ modulation of another electrode of the same electron gun is such as to produce an electron beam modulated in intensity according to R inasmuch as $(R-Y)+Y=R$. Similarly, the other two electron beams are intensity modulated in accordance with green and blue signals. In a practical case all the cathodes may be energized with the Y signal and the grids energized with the color difference signals or vice versa. It makes no difference in the practice of this invention whether all the electron guns are within one tube or each in separate tubes or in what way the electron beams are used to create the color image. The images formed in response to a single color signal are partial images. A full color image is the sum of the superimposed partial images.

Variations in brightness in a color image require that there be no changes in hue, i. e., the changes in the red, green and blue light must be equal. If the overall characteristics of the apparatus were the same for the red, green and blue light, a change in brightness could be brought about by changing the bias of each electron gun by the same amount. However, the fact is that the gains of the electron guns and the efficiencies of the phosphors are not the same. Then too, the transmission efficiency of various optical filters that may be interposed between the final image and the viewer may be different for the different colors. If these differences in characteristics are not too great, they can be compensated for by applying potentials to certain gain control electrodes in such manner as to vary the gains of the electron guns. However, this approach to the problem is not always possible because not all electron guns are provided with such electrodes. Even when they are present, additional controls are required to produce the desired potentials. In addition, the changes in gain effected by altering the potential applied to the gain control electrodes may be insufficient to compensate for all the variations in characteristics encountered in practice.

Accordingly, it is an object of this invention to provide a master brightness control arrangement in which the proper adjustment is relatively simple.

It is another object of this invention to provide a master brightness control having a minimum number of components.

Briefly, these objectives may be attained by applying varying amounts of the brightness signal to a first set of electrodes, applying the color difference signals with desired relative amplitudes to a second set of electrodes, selectively biasing one set of electrodes and applying any changes in bias wrought by the different settings of the master brightness control to the first set of electrodes via the same potential distribution network used for applying the brightness signal to the first set of electrodes.

The manner in which these objectives, as well as other advantages of this invention are obtained will be better understood after the following discussion of the drawings in which.

Figure 1:
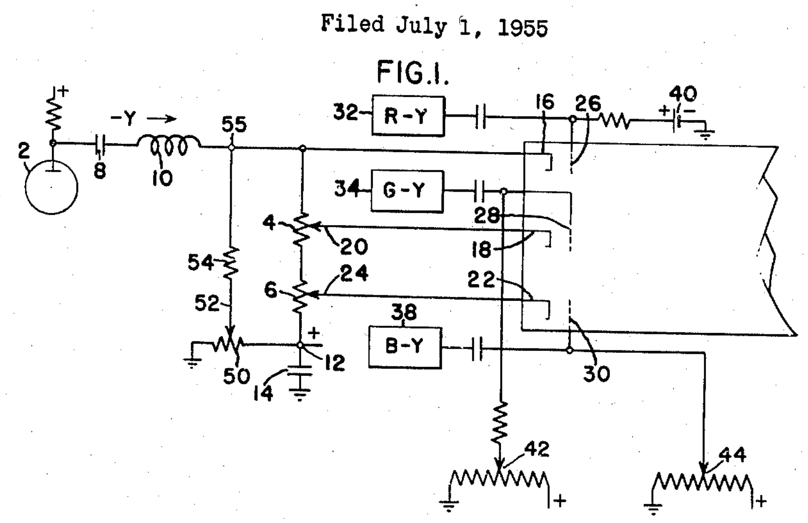
Figure 1 illustrates an embodiment of the invention wherein the Y or luminosity signal is applied to the cathodes of the electron guns and the color difference signals are applied to the grids.

In Figure 1, luminosity signals Y are supplied by any suitable source, herein indicated as being an amplifier 2, and are coupled to serially connected potentiometers 4 and 6 via a capacitor 8 and an inductance 10. The lower end of the potentiometer 6 is connected to a point of fixed positive potential as at 12, which is bypassed for frequencies in the Y or luminosity signal by a capacitor 14. A cathode 16 of a red electron gun is connected to the upper end of the potentiometer 4, a cathode 18 of a green electron gun is connected to a movable arm 20 of the potentiometer 4, and a cathode 22 of a blue electron gun is connected to a movable arm 24 of the potentiometer 6. In this way different fractional amounts of the Y signal are applied to the cathodes so that the cathode 16 is driven harder than the cathode 18 and the cathode 18 is driven harder than the cathode 22.

The grids 26, 28 and 30 are selectively energized by sources 32, 34 and 38 of $R-Y$, $G-Y$ and $B-Y$ signals respectively. It is understood that the outputs of these sources are variable. Each of the grids is separately biased by returning the associated grid-leak resistors to sources of fixed potential such as a battery 40, potentiometer 42 and potentiometer 44.

In the embodiment of this invention, shown in Figure 1, one end of a master brightness control potentiometer 50 is connected to the point 12 of fixed positive potential and the other end is connected to ground as shown. The movable arm 52 of the potentiometer 50 is connected via a resistor 54 to the upper end of the potentiometer 4. Although the invention is in no way limited to particular values, very satisfactory results were obtained with the potentiometers 4 and 6 having a combined resistance of 10,000 ohms and the potentiometer 50 and the resistor 54 each having a resistance of 20,000 ohms. With this particular network, it is assumed that the amounts of drive fall within the adjustment range of the potentiometers 4 and 6.

It is apparent that potentiometers 4 and 6 can be adjusted so as to produce properly proportioned amplitudes of the Y signal to the various cathodes. At the same time, the grid voltages can be set so that each electron gun is cut off when the Y signal applied at the top of the potentiometer 4 reaches a given voltage level. Once proper color balance is achieved for any adjustment of the brightness control potentiometer 50, the color balance is not disturbed by any shift to a different brightness setting of the tap 52. The reason for this is that any change in voltage brought about in this manner is applied to the cathodes in the same ratios as the Y signal. Although other circuits might be used to perform this function, the particular one shown by way of example in Figure 1 is extremely simple. Any voltage change brought about at the point 55 by movement of the tap 52 must be applied to the various cathodes in the same proportion as the Y signal because it is applied by the same circuit. It is important that the point 12 substantially hold its fixed potential for various settings of the master brightness control tap 52.

Figure 2:
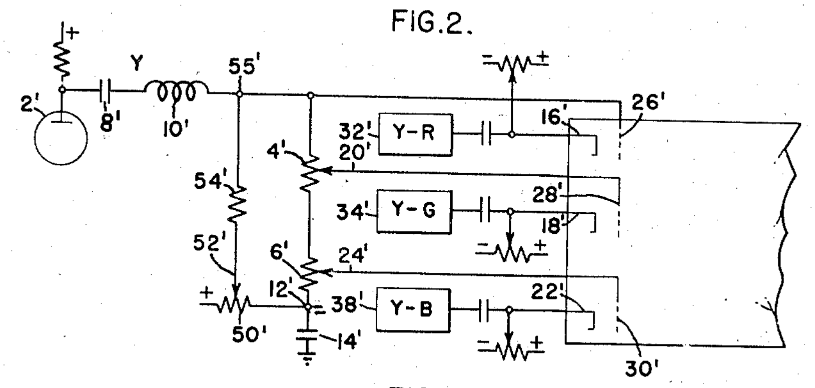
Figure 2 illustrates an embodiment of the invention wherein the Y or luminosity signal is applied to the grids and the color difference signals are applied to the cathodes of the electron guns.

Figure 2 illustrates another embodiment of the invention in which the same numerals primed indicate components corresponding to parts of Figure 1. However, in this particular embodiment of the invention, it is to be noted that the polarity of all the signals is reversed. The master brightness control potentiometer 50′ is coupled in the same way as in Figure 1, except that now its variations in potential are applied to the grids rather than to the cathodes.

Figure 3:
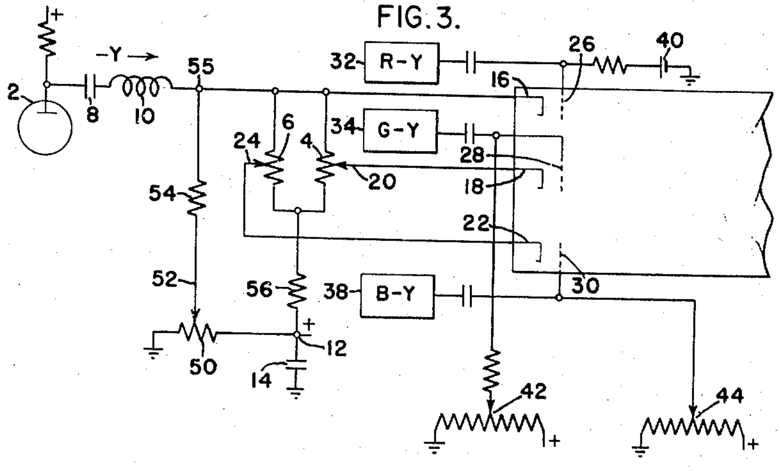
Figure 3 illustrates an embodiment of the invention that is similar to that shown in Figure 1, except that the Y signal is applied to the cathodes via parallel potentiometers.

The potentiometers 4 and 6 of Figure 1 could be connected in parallel, as indicated in Figure 3. In this arrangement, a resistor 56 may be placed in series with the potentiometers 4 and 6 so as to permit the use of potentiometers having less resistance. In any arrangement, however, the variations in potential produced by varying the master brightness control are applied to the electron guns by the same circuit that applied the Y or brightness signal to these guns.

Overall adjustment of the controls may be achieved in the following manner: A picture of about normal contrast and brightness is produced by controls, not shown, and the master brightness control. The amplitudes of the color difference signals are reduced to zero by controls not shown. Now the bias potentiometers 42 and 44 are adjusted until the darkest portions of the picture are just a neutral gray. Then gain potentiometers 4 and 6 are adjusted to give highlight whites of the proper color temperature. This procedure must be repeated several times because the adjustments are somewhat interacting. However, when the adjustments are completed, the proper color balance will be maintained with all settings of the master brightness control 50.

Whereas the invention has been described as being embodied in a color image reproducing system wherein luminosity or Y signals are applied to one set of electrodes and color difference signals to another set of electrodes, it should be understood that it may be embodied in other types of color reproducing systems. For example, it can be applied to a system in which the luminosity signal is accompanied by chroma signals and the detection carried on in the cathode-ray tube. On the other hand, the detection of the color signals could be carried on outside of the cathode-ray tube. In any case, however, changes in the voltage supplied by the master brightness control are applied to the electrodes of the colored image reproducing system by the same circuits as the luminosity or Y signal, whether or not the Y signal is alone or is accompanied by other signals.

While I have illustrated a particular embodiment of my invention, it will of course be understood that I do not wish to be limited thereto, since various modifications, both in the circuit arrangement and in the instrumentalities, may be made and I contemplate by the appended claims to cover any such modifications as fall within the true spirit and scope of the invention.

What I claim as new and desire to secure by Letters Patent of the United States is:

1. Apparatus for reproducing images from video signals comprising, in combination, means for forming a plurality of partial images, said means including a plurality of electron guns, each gun having a pair of beam intensity control electrodes, a source of video signals corresponding to luminosity, means for coupling the luminosity signals produced by said source to corresponding control electrodes of each of said guns in predetermined ratios, a plurality of sources of color difference signals, means for applying each of said color difference signals to a separate one of the other control electrodes of said electron guns, a source of direct-current potential, means for varying said source of direct-current potential and means for applying variations in said direct-current potential to the means by which the luminosity signals are applied to the guns.

2. In apparatus for reproducing images in color or in black-and-white, a master brightness control that maintains a proper color balance for all brightness settings, the combination of a source of luminosity signals, a plurality of electron guns, each gun having a pair of control electrodes of such nature that the voltage applied between the electrodes of each pair controls the intensity of the beam of electrons projected by the gun, means for coupling the luminosity signals appearing at the output of said source between each of said pair of electrodes in each gun with predetermined ratios, a source of potential, means for varying said source of potential and means for applying any variations of said source of potential to said first-mentioned means.

3. In apparatus for reproducing images from video signals the combination of a source of luminosity signals, a plurality of sources of color difference signals, a plurality of electron guns, each gun having a cathode and a grid, a first point of fixed potential, and a second point of fixed potential, a first potentiometer having a movable tap, said potentiometer being connected between said first and second points of fixed potential, a first impedance connected between said first point of fixed potential and the output of said source of luminosity signals, connections between each of said cathodes and different points on said first impedance, a second impedance connected between said tap and the output of said source of luminosity signals, and connections between each of said grids and one of said sources of color difference signals, said first potentiometer thus constituting a master brightness control whereby variations in potential supplied by it are applied to said cathodes in the same proportions as said luminosity signal.

4. Apparatus for reproducing images comprising, in combination, a plurality of systems for translating video signals into corresponding partial images, each of said systems having different overall efficiencies, means for applying the video signals to each of said systems with different predetermined energy levels so as to compensate for the differences in the efficiencies of the systems, a source of direct-current potential, means for changing the magnitude of said source of direct-current potential and means for applying any changes in said direct-current potential to said first-mentioned means so as to change the light level of the system in the same ratio as said predetermined energy levels.

References Cited in the file of this patent

UNITED STATES PATENTS 2,722,563 Loughlin ............... Nov. 1, 1955

FOREIGN PATENTS 689,821 Great Britain ............ Apr. 8, 1953